United States Patent
Iida et al.

(10) Patent No.: US 9,506,544 B2
(45) Date of Patent: Nov. 29, 2016

(54) SEAL MEMBER AND LINEAR MOTION GUIDE DEVICE USING SAME

(75) Inventors: Katsuya Iida, Shinagawa-ku (JP);
Soshi Miyahara, Shinagawa-ku (JP);
Hideo Saito, Shinagawa-ku (JP);
Toshiaki Kadono, Shinagawa-ku (JP);
Masahiko Yoshino, Shinagawa-ku (JP);
Tsutomu Togashi, Shinagawa-ku (JP);
Eri Kameda, Shinagawa-ku (JP);
Futoshi Nakamura, Shinagawa-ku (JP)

(73) Assignee: THK CO., LTD., Tokyo (JP)

( * ) Notice: Subject to any disclaimer, the term of this patent is extended or adjusted under 35 U.S.C. 154(b) by 317 days.

(21) Appl. No.: 13/988,610

(22) PCT Filed: Dec. 9, 2011

(86) PCT No.: PCT/JP2011/078509
§ 371 (c)(1),
(2), (4) Date: May 21, 2013

(87) PCT Pub. No.: WO2012/086432
PCT Pub. Date: Jun. 28, 2012

(65) Prior Publication Data
US 2013/0255419 A1    Oct. 3, 2013

(30) Foreign Application Priority Data

Dec. 20, 2010 (JP) .................. 2010-283522
Dec. 6, 2011 (JP) .................. 2011-267221

(51) Int. Cl.
*F16H 25/00* (2006.01)
*F16H 25/24* (2006.01)
(Continued)

(52) U.S. Cl.
CPC .......... *F16H 25/2418* (2013.01); *F16H 25/24* (2013.01); *F16J 15/3224* (2013.01);
(Continued)

(58) Field of Classification Search
CPC .................. Y10T 74/18712; Y10T 74/18744; F16H 225/22418; F16C 33/7806
USPC .......................................... 277/354
See application file for complete search history.

(56) References Cited

U.S. PATENT DOCUMENTS 2,818,745 A * 1/1958 Spontelli .................. 74/89.4
6,155,717 A  12/2000 Michioka et al.
(Continued)

FOREIGN PATENT DOCUMENTS

DE    3641682 A1 * 6/1988 .......... F16J 15/3232
JP    S55-123017    9/1980
(Continued)

OTHER PUBLICATIONS

International Search Report, PCT/JP2011/078509, Mar. 13, 2012.

*Primary Examiner* — Victor MacArthur
(74) *Attorney, Agent, or Firm* — Young & Thompson (57) ABSTRACT

A ball screw device or linear motion guide device has a seal member preventing dust and dirt from entering into a movable member of a linear motion guide device and seals out fine dust, dirt or like by surely contacting a seal to a shaft member without providing a large margin to the seal. The seal member includes a body portion mounted to the movable member and a lip portion contacting an outer portion of the shaft member, the lip portion has an oblique surface having an axial section inclining with respect to its axial direction, the body portion has an urging member urging the lip portion in a diameter direction of the shaft member and a reinforcing portion reinforcing the body portion. The urging member is located on the reinforcing portion side than the tip end of the lip portion in the axial sectional shape of the lip portion.

12 Claims, 7 Drawing Sheets

(51) Int. Cl.
*F16J 15/32* (2016.01)
*F16H 25/22* (2006.01)

(52) U.S. Cl.
CPC ....... *F16H25/2204* (2013.01); *F16H 25/2214* (2013.01); *Y10T 74/19702* (2015.01); *Y10T 74/19744* (2015.01)

(56) References Cited

U.S. PATENT DOCUMENTS

| | | | |
|---|---|---|---|
| 6,364,058 B1* | 4/2002 | Nishide et al. | 184/5 |
| 8,336,416 B2* | 12/2012 | Chiu et al. | 74/424.87 |
| 2002/0036384 A1* | 3/2002 | Nakagawa | 277/628 |
| 2002/0056330 A1* | 5/2002 | Nishide | 74/89.44 |
| 2002/0062705 A1* | 5/2002 | Michioka et al. | 74/424.82 |
| 2002/0113376 A1* | 8/2002 | Yabe et al. | 277/570 |
| 2010/0192711 A1* | 8/2010 | Shirai | F16H 25/2219 74/89.4 |

FOREIGN PATENT DOCUMENTS

| | | |
|---|---|---|
| JP | U60-107457 | 7/1985 |
| JP | U60-107458 | 7/1985 |
| JP | 10-184683 | 7/1998 |
| JP | 10-299854 | 11/1998 |
| JP | 2000-135600 | 5/2000 |
| JP | 2006-300192 | 11/2006 |
| JP | 2010-139043 | 6/2010 |
| JP | 2010-185516 | 8/2010 |

* cited by examiner

SEAL MEMBER AND LINEAR MOTION GUIDE DEVICE USING SAME

TECHNICAL FIELD

The present invention relates to a seal member used for a linear motion guide device such as ball screw device, and also relates to a linear motion guide device such as ball screw device using such seal member.

BACKGROUND ART

A ball screw device is provided with a nut having an inner peripheral surface in which a helical screw groove is formed, a screw shaft having an outer peripheral surface in which a helical screw groove is formed, and a plurality of rolling members that are arranged between the screw groove of the nut and the screw groove of the screw shaft. The nut is formed with an endless circulation path connecting one end of the screw groove of the nut and another end thereof, and a rolling member that rolls and reaches the one end of the screw groove circulates toward the other end thereof through the endless circulation path. According to such structure, in the ball screw device, the nut is capable of being linearly reciprocally moved along the axial direction of the screw shaft according to the rotation of the screw shaft.

In the ball screw device of the structure mentioned above, the nut is moved along the screw shaft having long scale, and accordingly, if the nut is moved in a state in which foreign materials such as work cut chip, or dust and dirt adhere to the screw shaft, the rolling member rolling in the rolling member rolling groove bites such foreign material, which may deteriorate moving performance of the nut rolling in the rolling member rolling groove in an early stage of operation. Because of such reason, in an actual use of the ball screw device, it is general to adopt a structure in which seal members for sealing clearances or gaps between the nut and the screw shaft at both the end portions in the axial direction of the nut is arranged to thereby remove the foreign materials adhering to the screw shaft by the seal members in association with the movement of the nut.

For example, as described in the following Patent Document 1, there is known a ball screw device which is provided with a nut having an inner peripheral surface in which a screw groove is formed, a screw shaft having an outer peripheral surface in which a screw groove is formed, balls arranged between track grooves formed by the screw groove of the nut and the screw groove of the screw shaft, and a plurality of ring-shaped seal members. Each of the seal members has a body portion having an edge portion fixed to the nut and a lip portion contacting the outer peripheral surface of the screw shaft and the screw groove in an elastically deformable manner, and a lubricant containing member is disposed between the adjacent seal members.

According to the ball screw device of the structure mentioned above, since the lubricant containing member is disposed between the adjacent seal members, lubrication can be performed to the lip portions of both the seal members without increasing torque which may be caused when grease is applied, and high sealing performance can be ensured.

PRIOR ART DOCUMENT

Patent Document

Patent Document 1: Japanese Patent Laid-open Publication No. 2010-185516.

DISCLOSURE OF THE INVENTION

Problems to be Solved by the Invention

However, in the conventional ball screw device, since the sealing is performed by elastically deforming the seal members so as to contact the outer peripheral surface of the screw shaft and the screw groove and provide fastening margin to the seal member, it is difficult to mount the seam members with high performance because of working error causing in seal or screw shaft working process, and in a case where the ball screw device is applied to a laser working machine, a very fine working chip having a particle diameter of merely several tens μm generated during the working operation by a laser working machine, thereby providing undesirable defect.

In addition, in the conventional ball screw device, since the seal member contacts the outer peripheral surface of the screw shaft and the screw groove by elastically deforming the seal members, friction heat is generated by such contacting, and torque is increased, thereby providing a problem, and moreover, long term use causes the seal to wear, which extremely deteriorate the sealing performance, thus being defective.

Furthermore, similar problems have been provided in a linear motion guide device which is provided with a shaft member having a rolling member rolling portion, a movable member having a loaded rolling member rolling portion disposed so as to oppose to the rolling member rolling portion, a number of rolling members arranged to be capable of performing rolling motion between the rolling member rolling portion and the loaded rolling member rolling portion, and a sealing device mounted at least to one end of the movable member.

The present invention was made to solve the defects or problems encountered in the prior art such as described above, and an object thereof is to provide a ball screw device or a linear motion guide device capable of surely preventing dust or like from entering from outside of a movable member of a linear motion guide device and being provided with a function of high dust-proof performance by surely contacting a seal to the shaft member without providing excessive fastening margin to the seal. Furthermore, another object of the present invention is to provide a seal member capable of preventing lubricant such as grease retained inside the movable member from splashing outward and also provide a ball screw device and a linear motion guide device provided with such seal member.

Means for Solving the Problems

The seal member according to the present invention is a seal member mounted to an axial end surface of a movable member of a linear motion guide device in which a plurality of rolling members are interposed so as to perform rolling motion between a shaft member and the movable member, wherein the seal member includes a body portion to be mounted to the movable member and a lip portion contacting an outer peripheral portion of the shaft member, the lip portion is provided with an oblique surface having an axial section inclining with respect to the axial direction thereof, the body portion is provided with an urging member urging the lip portion in a diameter direction of the shaft member and a reinforcing portion reinforcing the body portion, and the urging member is located on the reinforcing portion side than the tip end side of the lip portion in the axial sectional shape of the lip portion.

The ball screw device according to the present invention is a ball screw device including: a screw shaft provided with a helical rolling member rolling groove formed in an outer peripheral surface thereof; a nut formed with a loaded rolling member rolling groove formed in an inner peripheral surface thereof so as to oppose to the rolling member rolling groove; a plurality of rolling members arranged between the rolling member rolling groove and the loaded rolling member rolling groove to be movable in a rolling manner; and a seal device mounted to at least one end of the nut, wherein the seal device is provided with a seal member provided with a body portion mounted to the movable member and a lip portion contacting an outer peripheral portion of the shaft member or the rolling member rolling groove, the lip portion is provided with an oblique surface having an axial section inclining with respect to the axial direction thereof, the body portion is provided with an urging member urging the lip portion in a diameter direction of the shaft member and a reinforcing portion reinforcing the body portion, and the urging member is located on the reinforcing portion side than the tip end of the lip portion in the axial sectional shape of the lip portion.

Effects of the Invention

According to the present invention, since the seal member linearly contacts the shaft member with a constant fastening margin, there is less generated heat, and foreign material can be surely removed. Furthermore, the location of the urging means urges the seal member toward the diameter direction of the shaft member, so that even if the tip end of the lip portion wears, the contacting state can be always kept. Moreover, since the one end surface of the lip portion is formed as an oblique surface and the urging means is shifted on the reinforcing member side from the tip end side of the lip portion, the deforming force is always applied to the lip portion from the constant direction, and the invasion of the dust or like from the outside of the ball screw device or linear motion guide device can be surely prevented from entering, as well as preventing the splashing of the lubricant from the inside of the movable member.

BRIEF DESCRIPTION OF THE INVENTION

MODE FOR CARRYING OUT THE INVENTION

Hereunder, an embodiment of a ball screw device according to the present invention will be explained with reference to the accompanying drawings. It is further to be noted that the following embodiment does not limit the invention recited in respective claims, and all the combination of subject features explained in the embodiment is not necessarily essential for the solution of the present invention.

Figure 1:
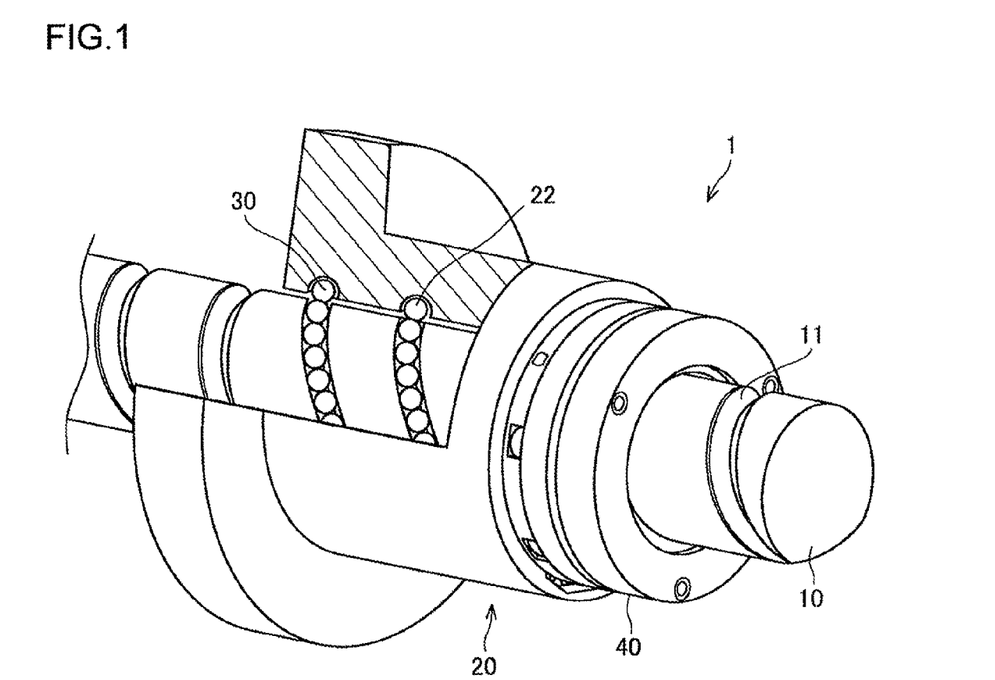
FIG. 1 is a perspective view, partially in section, showing one embodiment of a ball screw device according to the present invention.
Figure 2:
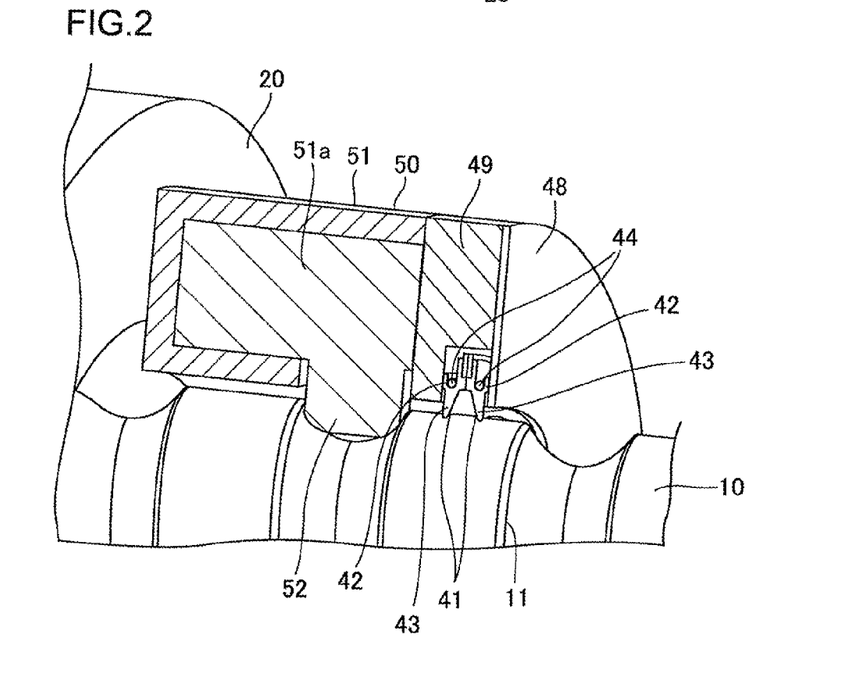
FIG. 2 is a partially sectional view illustrating a structure of the embodiment of the ball screw device according to the present invention.
Figure 3:
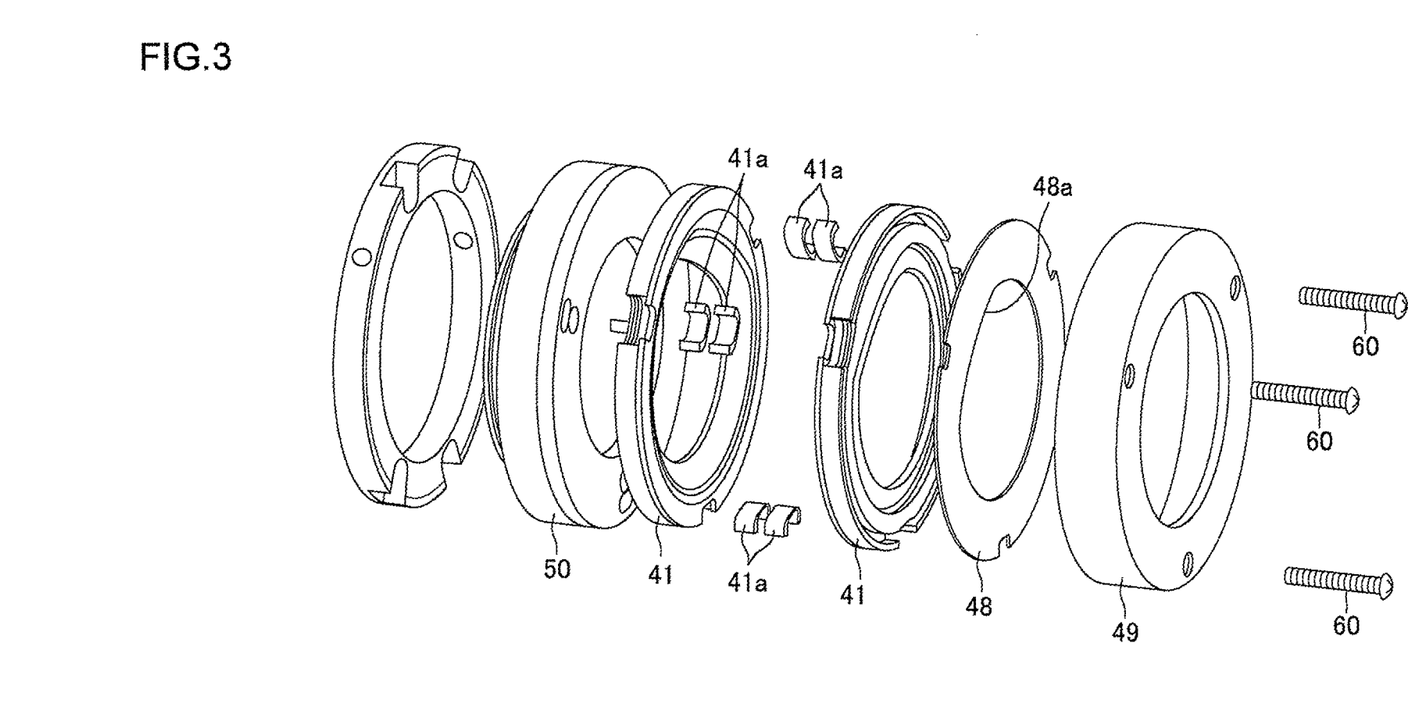
FIG. 3 is an exploded view of a seal device of the embodiment of the ball screw device according to the present invention.
Figure 4:
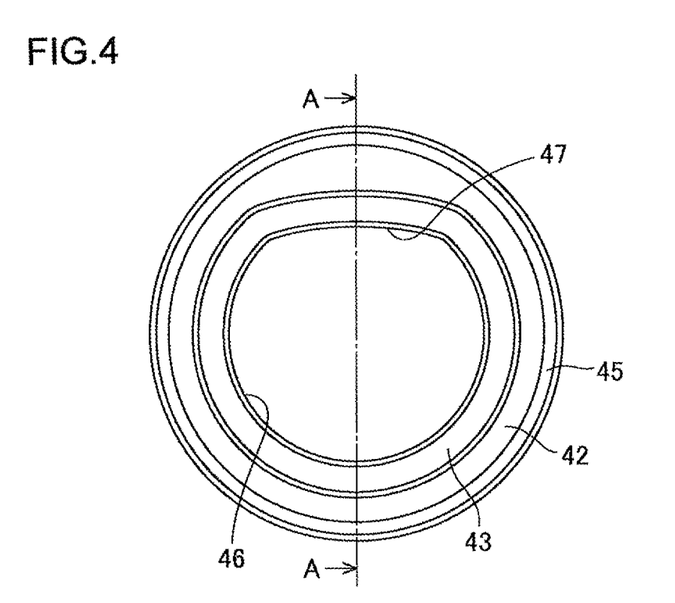
FIG. 4 is a front view of a seal member used for the embodiment of the ball screw device according to the present invention.
Figure 5:
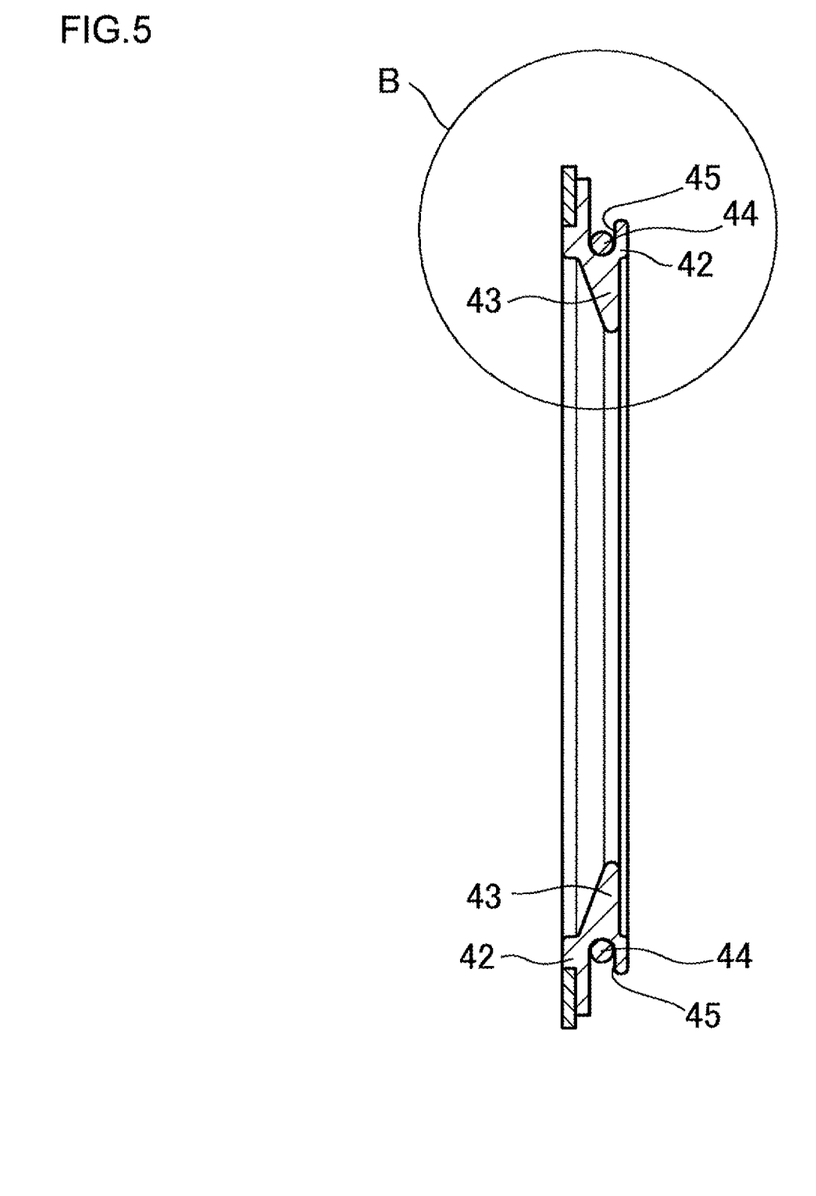
FIG. 5 is a sectional view taken along the line A-A in FIG. 4.
Figure 6:
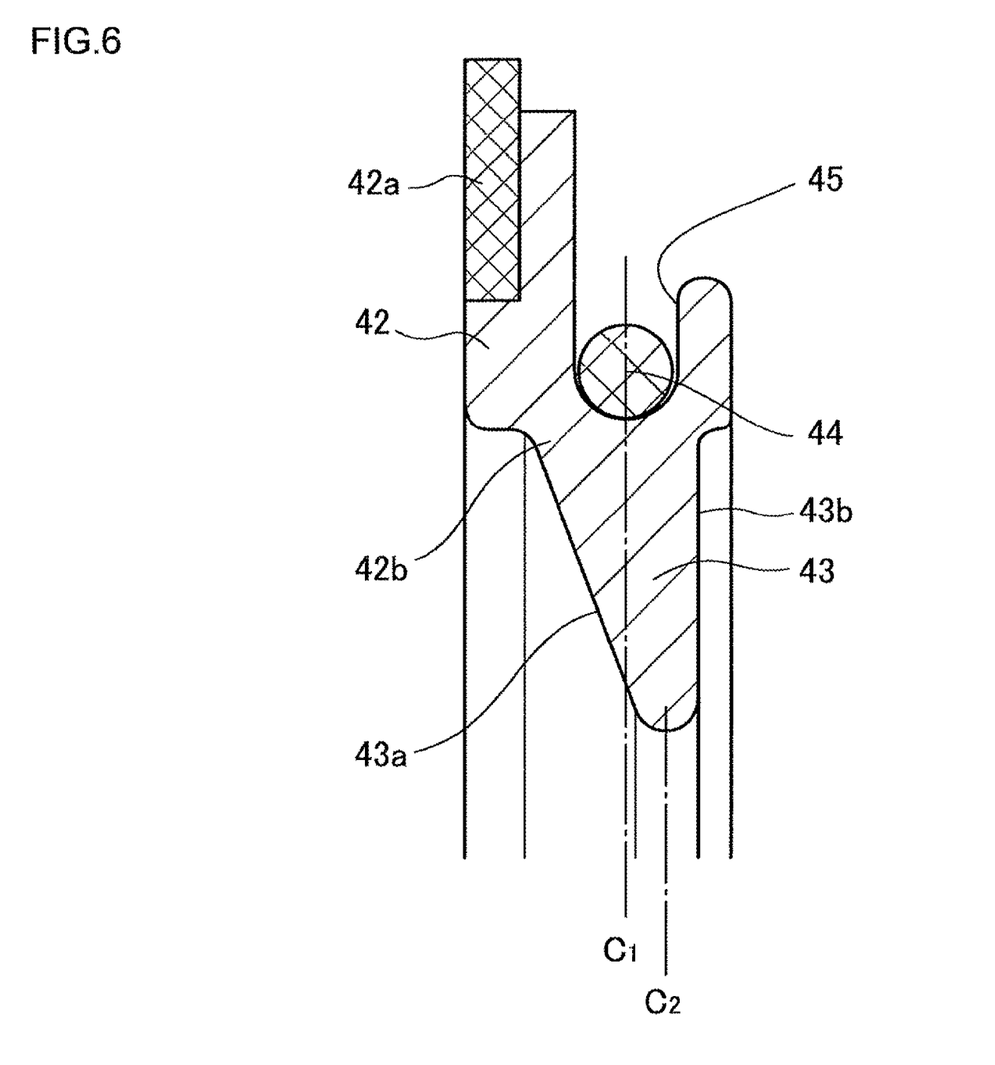
FIG. 6 is an enlarged view of a portion B in FIG. 5.
Figure 7:
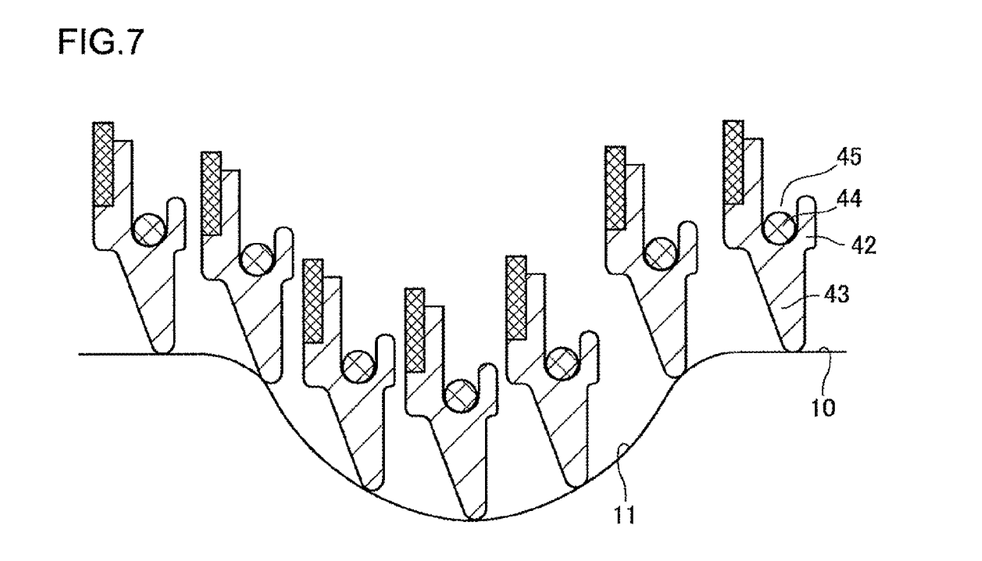
FIG. 7 is an illustration showing a state in which the seal member contacts a screw shaft.
Figure 8:
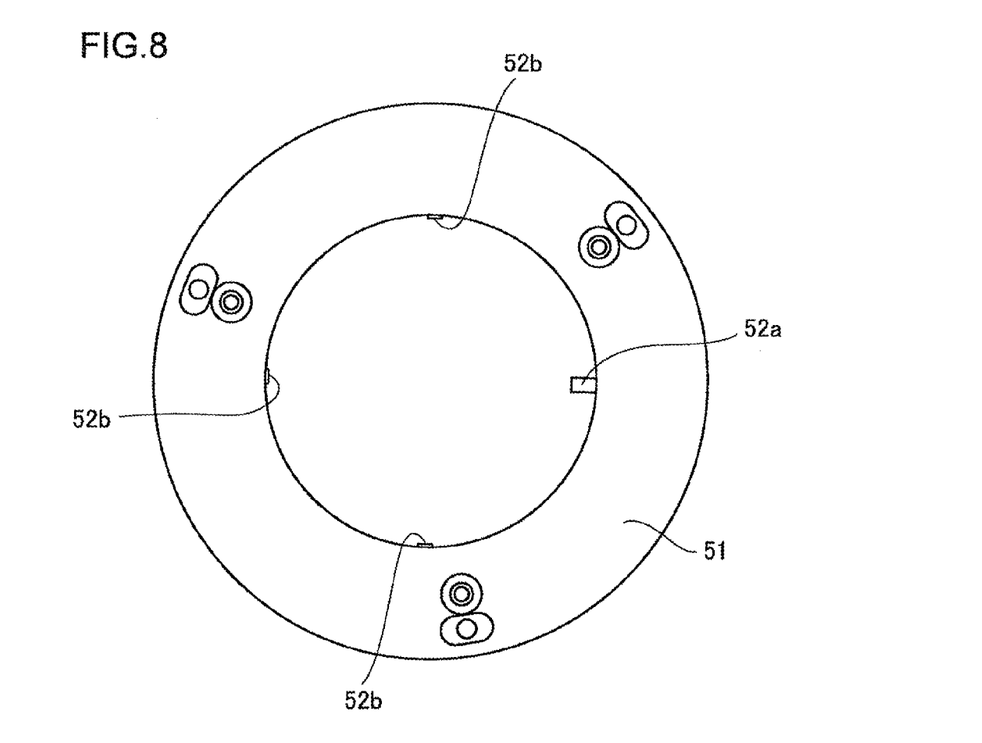
FIG. 8 is an illustration of a lubricating means of an embodiment of the ball screw device according to the present invention as viewed from the axial direction.
Figure 9:
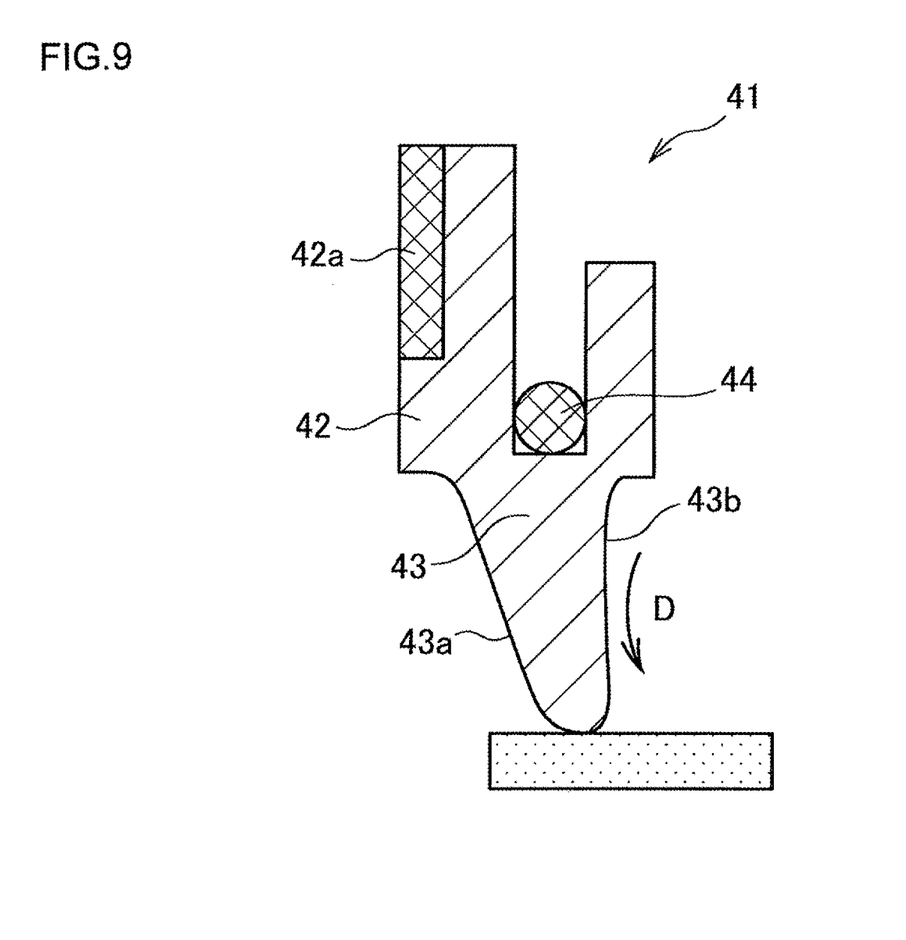
FIG. 9 is a view explaining a contacting condition of the seal member used for the embodiment of the ball screw device according to the present invention.

FIG. 1 is a perspective view, partially in section, showing one embodiment of a ball screw device according to the present invention, FIG. 2 is a partially sectional view illustrating a structure of the embodiment of the ball screw device according to the present invention, FIG. 3 is an exploded view of a seal device of the embodiment of the ball screw device according to the present invention, FIG. 4 is a front view of a seal member used for the embodiment of the ball screw device according to the present invention, FIG. 5 is a sectional view taken along the line A-A in FIG. 4, FIG. 6 is an enlarged view of a portion B in FIG. 5, FIG. 7 is an illustration showing a state in which the seal member contacts a screw shaft, FIG. 8 is an illustration of a lubricating means of an embodiment of the ball screw device according to the present invention as viewed from the axial direction, and FIG. 9 is a view explaining a contacting condition of the seal member used for the embodiment of the ball screw device according to the present invention.

FIG. 1 shows a ball screw device 1 according to the present embodiment. The ball screw device 1 according to the present embodiment is composed of a screw shaft 10 as a shaft member having an outer peripheral surface in which a rolling member rolling groove 11 is formed in a helical shape having a predetermined pitch, and a nut 20 as a movable member to be engaged with the screw shaft through a plurality of rolling members 30 and formed with an endless circulation path, not shown, for the rolling members 30. In the ball screw device 1 of the structure mentioned above, the nut 20 is moved along the axial direction of the screw shaft according to relative rotating motion between the screw shaft 10 and the nut 20. Further, the rolling member rolling groove 11 is subjected to surface treatment with performance of the extent capable of realizing the smooth rolling motion of the rolling members. The rolling surface may be formed so as to provide a gothic-arch shape or circular-arc shape.

As shown in FIGS. 1 and 2, the nut 20 has an inner peripheral surface in which a loaded rolling member rolling groove 22 opposing to the rolling member rolling groove 11, and is provided with a nut body having substantially cylindrical shape and a lubricating means 50 for applying a lubricant to the rolling member rolling groove 11 and an outer peripheral surface of the screw shaft screw 10. Further, as described above, a number of rolling members 30 are arranged between the rolling member rolling groove 11 and the loaded rolling member rolling groove 22, and the nut 20 is assembled with the screw shaft 10 through the rolling members 30.

A seal device 40 for performing the sealing between the interior and the exterior of the nut 20 is mounted to one axial end portion of the nut 20. The seal device 40 is provided with a pair of seal members 41, each having an approximately ring-shaped body portion 42 assembled with the nut 20 through the lubricating means 50 and a lip portion 43 extending obliquely toward radially inward from the inner peripheral surface of the body portion 42 so as to contact the outer peripheral surface of the screw shaft 10 and the rolling member rolling groove 11. Each of the lip portions 43 has a function of scraping off dust or like adhering to the outer peripheral surface of the screw shaft 10 and the rolling member rolling groove 11. Furthermore, the paired seal members 41, 41 are disposed in adjacent to each other in a back-to-back facing manner, and the lip portions 43 extend so as to be apart from each other from abutting surfaces of the adjacent body portion 42 so as to provide Λ-shape in section.

Still furthermore, a plate member 48 having substantially the same axially projecting geometry as that of the seal member 41 is attached to an end portion of the seal member 41. The plate member 48 is a ring-shaped member assembled so as to hold the seal member 41 in the axial direction, and has an inner peripheral surface located with a predetermined clearance from the outer peripheral surface of the screw shaft 10 and the rolling surface of the rolling member rolling groove 11. The inner peripheral surface of the plate member 48 acts as a scraper 48a for realizing the sealing from dust or like having a size larger than the predetermined clearance.

As shown in FIG. 3, a pair of seal members 41, 41 are assembled with the end portions of the lubricating means 50 by means of colors 41a, 41a, respectively. The colors 41a are members through which bolts 60, described herein later, are inserted, and act to position the seal members 41, 41. As described above, the seal device 40 is assembled in a manner such that the paired seal members 41, 41 and the plate member 48 are arranged in this order, and in this arrangement, a case 49 is provided so as to cover the most outer peripheral surface and most end portion, and thereafter, the bolts 60 are fastened, thus constructing the seal device 40.

The details of each of the seal members 41, 41 will be described hereunder with reference to FIGS. 4 to 6.

As shown in FIG. 4, the body portion 42 has an approximately ring-shape, and as shown in FIG. 5, each of the lip portions 43 is formed so as to protrude in an inner diameter direction from the inner peripheral surface of the body portion 42. Further, the lip portion 43 has a tongue shape in section and constitutes a portion slidably contacting to the screw shaft 10.

As shown in FIG. 6, urging means 44 is fitted in a groove 45 formed in the body portion 42 of the seal member. In the present embodiment, as such urging means 44, an annular ring-shaped coil spring as spring member is used. The body portion 42 has an inclined surface 43a having an axially end portion to which a reinforcing member 42a is attached for reinforcing the body portion 42. The reinforcing member 42a is preferably formed of a ring-shaped metal plate.

The lip portion 43 has an oblique surface 43a having one end inclined with respect to the axial direction in an axial sectional shape, and a surface of the lip portion opposite to this oblique surface 43a is formed as perpendicular surface 43b intersecting substantially perpendicularly to the axial direction thereof. In addition, a connection portion of the oblique surface 43a to the body portion 42 is formed with a deformed portion 42b having thin thickness.

Furthermore, the tip (front) end portion of the lip portion 43 is located in a manner shifted on the perpendicular surface 43b side with respect to the groove 45 to which the urging means 44 is assembled. That is, the center C1 of the urging means 44 is apart from the tip end portion C2 of the lip portion 43 from each other along the axial direction, and the tip end portion of the lip portion 43 is positioned on the perpendicular surface 43b side and the center C1 of the urging means 44 is positioned on the oblique surface 43a side, respectively. Further, since the groove 45 to which the urging means 44 is fitted is arranged on the oblique surface 43a side as mentioned above, the deformed portion 42b can be formed to be further thinner.

Still furthermore, as shown in FIG. 4, the lip portion 43 is provided with a circular-arc portion 46 having a circular arc inner peripheral shape and a swelled portion 47 swelled in the inner diameter direction from the circular-arc shape portion. The circular-arc portion 46 contacts the outer peripheral surface of the screw shaft 10 to thereby seal the outer peripheral surface thereof, and the swelled portion 47 contacts the rolling surface of the rolling member rolling groove 11 to thereby seal the rolling surface of the rolling member rolling groove 11.

As described above, the seal members 41 contact each other in the axial direction of the screw shaft 10 by applying predetermined pressure by the urging means 44, so that, as shown in FIG. 7, the seal members 41 can contact both the outer peripheral surface of the screw shaft 10 and the rolling surface of the rolling member rolling groove 11 with the predetermined pressure. In addition, since the tip end of the lip portion 43 is formed so as to provide an R-shape, the tip end can softly contacts at the continuous portion of the outer peripheral surface of the screw shaft 10 and the rolling surface of the rolling member rolling groove 11. Further, the seal member 41 is formed of a material or a member having elasticity or flexibility, such as rubber, so as to apply the predetermined pressure to the screw shaft 10, and as such rubber member, hydrogenated acrylonitrile butadiene rubber (H-NBR) may be preferably utilized.

Furthermore, as shown in FIG. 9, since the seal member 41 has a cross sectional shape in the axial direction of the oblique surface 43a inclined with respect to the axial direction and the perpendicular surface 43b, rigidity on the perpendicular surface 43b side is larger than that on the oblique surface 43a side. In addition, since the tip end of the lip portion 43 is formed on the perpendicular surface 43b side than the center of the urging means 44, it is possible to contact the lip portion 43 to the outer peripheral surface of the screw shaft 10 and the rolling surface of the rolling member rolling groove 11 by deforming the lip portion 43 so that the tip end of the lip portion 43 is bent on the perpendicular surface 43b side along the deformed direction D of the lip portion 43 by the urging force of the urging means 44.

Still furthermore, the seal member 41 is provided with the reinforcing portion 42a on the oblique surface 43a side of the body portion 42 to thereby improve the rigidity on that side of the body portion, and on the other hand, the rigidity on the oblique surface 43a side of the lip portion 43 is made lower by forming the deformed portion 42b at the connection portion between the oblique surface 43a and the body portion 42, thus facilitating the deformation along the deforming direction D.

As described above, the seal member 41 is deformed in the constant direction along the deforming direction D under the state in which the lip portion 43 contacts the outer peripheral surface of the screw shaft 10 and the rolling surface of the rolling member rolling groove 11, so that the sealing performance can be easily improved by arranging the deforming direction D so as to opposite to the dust invading direction or lubricant leaking direction.

Next, the lubricating means 50 will be explained hereunder with reference to FIGS. 2 and 8.

The lubricating means 50 includes a lubricant retaining portion 51 for retaining the lubricant to be applied to the rolling surface of the rolling member rolling groove 11 and the outer peripheral surface of the screw shaft 10, and a lubricant supplying portion 52 for applying the lubricant to the rolling surface of the rolling member rolling groove 11 and the outer peripheral surface of the screw shaft 10. The lubricant retaining portion 51 is provided with a lubricant storage body 51a in which the lubricant is stored, and the lubricant storage body 51a is formed of a felt material, for example. The felt material forming the storage body 51a is composed of a substance capable of suitably storing the lubricant, such as for example, rayon+wool felt having porosity of about 80%.

On the other hand, the lubricant supplying portion 52 is formed of a felt material having a constant thickness contacting the storage body 51a, and the porosity of the felt material forming the lubricant supplying portion 52 is set to be lower than that of the lubricant storage body 51a. As the felt material of the lubricant supplying portion 52, a wool felt material having the porosity of, for example, about 50% is used.

Further, as shown in FIG. 8, a plurality of lubricant supplying portions 52 are located so as to protrude from the lubricant retaining portion 51 toward the inner circumferential direction of the nut 20. These lubricant supplying portions 52 includes first lubricant supplying portions 52a each protruding by a large amount and second lubricant supplying portions 52b each protruding by a small amount. The first lubricant supplying portions 52a contact the rolling surface of the rolling member rolling groove 11 and the second lubricant supplying portions 52b contact the outer peripheral surface of the screw shaft 10.

As mentioned above, the lubricating means 50 contacts the rolling member rolling groove 11 and the outer peripheral surface of the screw shaft 10, thus applying the lubricant to the rolling member rolling groove 11 and the outer peripheral surface of the screw shaft 10. The lubricant applied to the rolling member rolling groove 11 contributes to the smooth rolling motion of the rolling members, and the lubricant applied to the outer peripheral surface of the rolling member rolling groove 11 contributes to protect the lip portion 43 from wearing by the slide contact between the outer peripheral surface of the screw shaft 10 and the lip portion 43.

As described hereinbefore, according to the ball screw device 1 of the present embodiment, the lip portion 43 is formed with the oblique surface 43a inclined with respect to the axial direction, and the reinforcing portion 42a on the surface opposite to the oblique surface 43a, and the center C1 of the urging means 44 is positioned on the reinforcing member side than the tip end of the lip portion 43. Accordingly, in the state in which the lip portion 43 contacts the rolling surface of the rolling member rolling groove 11 and the outer peripheral surface of the screw shaft 10, the seal member 41 can be deformed in the constant direction along the deforming direction D, and accordingly, by arranging the deforming direction D so as to oppose to the dust invading direction or the grease splashing direction, the sealing performance can be easily improved.

Furthermore, since the other end surface of the lip portion 43 is formed as the perpendicular surface 43b substantially intersecting the axial direction, the rigidity of the perpendicular surface 43b side of the lip portion 43 can be improved, and in addition, the seal member 41 is likely deformed always in the constant direction along the deforming direction D in the state in which the lip portion 43 contacts the outer peripheral surface of the screw shaft 10 and the rolling surface of the rolling member rolling groove 11.

Furthermore, since the connection portion between the oblique surface 43a and the body portion 42 is formed as the deformed portion 42b having thin thickness, the seal member 41 is likely deformed always in the constant direction along the deforming direction D in the state in which the lip portion 43 contacts the outer peripheral surface of the screw shaft 10 and the rolling surface of the rolling member rolling groove 11.

Still furthermore, a pair of seal members 41 are disposed in a manner such that the lip portions 43 thereof extend in the direction apart from each other from the contacting surfaces of the adjacent body portions 42, thereby achieving both the dust invasion preventing function and the grease splash preventing function, and accordingly, the dust-proof function can be achieved with high performance.

Furthermore, since the urging means 44 is composed as a spring member assembled in the groove 45 formed in the body portion 42 of the seal member 41, the dust sealing function can be achieved with high performance with simple and compact structure.

Still furthermore, since the lip portion 43 is provided with the circular-arc portion contacting to the outer peripheral surface of the screw shaft 10 and the swelled portion contacting to the rolling surface of the rolling member rolling groove 11, both the outer peripheral surface of the screw shaft 10 and the rolling surface of the rolling member rolling groove 11 can be surely sealed. In addition, since the paired seal members 41, 41 are disposed in adjacent to each other such that the lip portions 43 extend so as to be apart from each other from abutting surfaces of the adjacent body portion 42 so as to provide ∧-shape, the inner (nut side) seal member 41 of the paired seal members 41, 41 can prevent the grease or like from splashing from the inside of the nut 20, and the outer side seal member 41 can prevent the dust or like from entering from the external side of the nut.

Still furthermore, the plate member 48 provided with the scraper portion 48a disposed with a predetermined clearance with respect to the outer peripheral surface of the screw shaft 10 and the rolling surface of the rolling member rolling groove 11 is provided to the end portion of the seal device 40, so that the dust or like having a size larger than the predetermined clearance can be prevented from invading by the scraper portion 48a.

Still furthermore, since the nut 20 is provided with the lubricating means 50 for applying the lubricant to the outer peripheral surface of the screw shaft 10 and the rolling surface of the rolling member rolling groove 11, the smooth rolling motion of the rolling members can be achieved and the lip portion 43 can be prevented from wearing by the slidable contact of the lip portion to the outer peripheral surface of the screw shaft 10.

EXAMPLE

With respect to the ball screw apparatus according to the present embodiment and a conventional ball screw apparatus provided with a seal member, foreign material invading (entering) amount, sealing performance and heat generation amount were measured. Further, with the conventional seal member, measurements using two kinds (i.e., contact type and non-contact type) of devices were performed.

For the measurement of the foreign material invading amount, a constant amount of grease mixed with foreign material having particle diameter of less than 60 μm was applied on the outer peripheral surface of the screw shaft and the rolling member rolling groove, the nut is continuously reciprocated, and thereafter, the density of the foreign material in the grease in the nut was measured.

In the result of such measurement, the ball screw device according to the present embodiment indicated foreign material concentration of 0.017 to 0.034% W, and in comparison, with the conventional contact-type seal member, foreign material concentration of 0.175 to 0.278% W was obtained. As mentioned above, according to the ball screw device of the present embodiment, the invasion of the foreign material can be remarkably prevented in comparison with the conventional seal member, and there exhibited such a result as that high dust-proof performance can be provided with respect to the dust or dirt having particle diameter of several tens μm.

The measurement of the sealing performance was made by sealing a constant amount of grease inside the nut, then continuously reciprocating the nut, and thereafter, measuring the amount of the grease adhering to the screw shaft, and in such manner, the amount of the grease splashed outward of the nut was measured.

As a result of such measurement, the ball screw device according to the present embodiment indicated a result in which of grease splashed amount was of 0.23 to 0.36 g, and on the other hand, with the conventional non-contact type seal member, 2.34 to 3.28 g of splashed grease amount was obtained and with the conventional contact-type seal member, 0.50 to 0.55 g of splashed grease amount was obtained.

As mentioned above, the ball screw device of the present embodiment indicated that the splashed grease amount was small in comparison with the conventional seal member, and hence, the high sealing performance inside the nut was achieved.

The measurement of the heating amount was made by continuously reciprocating the nut, and temperatures on the nut outer surface and the outer surface of the screw shaft were measured every 30 minutes. In the measurement, the most high temperature was measured and collected among the measured temperatures and the increased amounts thereof were compared.

As a result, with the ball screw device 1 according to the present embodiment, increased amount of generated heat of 3.2° C. was obtained on the nut side, and on the other hand, increased amount of generated heat of 5.2° C. was obtained on the screw shaft side. Further, with the conventional non-contact type seal member, increased amount of generated heat of 10.0° C. was obtained on the nut side and increased amount of generated heat of 9.3° C. was obtained on the screw shaft side. On the other hand, with the conventional contact type seal member, increased amount of generated heat of 20.0° C. was obtained on the nut side and increased amount of generated heat of 28.7° C. was obtained on the screw shaft side. As mentioned above, according to the present embodiment, remarkably low value was indicated in comparison with both the conventional non-contact type and contact type seal members, thereby indicating a result of very small generated heat amount.

It is further to be noted that the present invention is not limited to the embodiments described above and many other changes and modifications may be made without departing from the spirits and scope of the appended claims. For example, hereinbefore, although the ball screw device is described as an embodiment of the present invention, the present invention may be applied to a linear motion guide device such as ball spline.

A ball spline comprises a spline shaft as a track member formed with plural rows of rolling member rolling portions extending along a longitudinal direction thereof and a spline nut as a movable member formed into substantially hollow cylindrical shape through which the spline shaft inserted and mounted to the spline shaft with a plurality of rolling members being interposed. The spline nut is formed with a plurality of endless circulation paths of the numbers corresponding to the plural rows of the rolling member rolling portions formed to the ball spline shaft, and by circulating the rolling members rolling along the rolling member rolling portions of the spline shaft in the endless circulation paths formed along the spline nut, the spline nut can be freely linearly reciprocated along the spline shaft.

Furthermore, as the rolling members, cylindrical rollers may be used as well as balls, and modes applied with such change or modification may be within the technical range of the present invention, which will be apparent from the recitation of the scope of the appended claims.

REFERENCE NUMERALS

1 - - - ball screw, 10 - - - screw shaft, 11 - - - rolling member rolling groove, 20 - - - nut, 40 - - - seal device, 41 - - - seal member, 42 - - - body portion, 42a - - - reinforcing portion, 42b - - - deformed portion, 43 - - - lip portion, 43a - - - oblique surface, 43b - - - perpendicular surface, 44 - - - urging means, 45 - - - groove, 46 - - - circular-arc portion, 47 - - - swelling portion, 48 - - - plate member, 48a - - - scraper portion, 50 - - - lubricating means, 51 - - - lubricant retaining portion, 52 - - - lubricant supplying portion, C1 - - - center line of urging member, C2 - - - center line of lip tip end, D - - - deforming direction.

The invention claimed is:

1. A seal member mounted to an axial end surface of a movable member of a linear motion guide apparatus in which a plurality of rolling members are interposed so as to perform rolling motion between a shaft member and the movable member comprising:
the seal member includes a body portion to be mounted to the movable member and a lip portion contacting an outer peripheral portion of the shaft member,
the lip portion is provided with an oblique surface having an inclined profile in an axial section with respect to an axial direction thereof and a surface opposing the oblique surface of the lip portion so as to intersect the axial direction of the lip portion,
the body portion is provided with an urging member urging the lip portion in a radial direction of the shaft member and a reinforcing portion reinforcing the body portion, and
the urging member is located in a groove away from a tip end of the lip portion in an axial sectional shape of the lip portion,
wherein the tip end of the lip portion is bent always in constant direction on a perpendicular surface side of the lip portion when the seal member is fitted to the linear motion guide apparatus.

2. The seal member according to claim 1, wherein a deformed portion is formed on a connecting portion between the oblique surface of the lip portion and the body portion.

3. A plurality of seal members, each seal member being the seal member according to claim 2, wherein the seal members are formed in at least one pair, and the lip portions of the respectively adjacent seal members extend so as to be separated from each other.

4. The seal member according to claim 2, wherein the movable member includes a lubrication unit including a lubricant retaining portion retaining a lubricant and a plurality of lubricant supply portions adapted to apply the lubricant to the rolling member rolling groove formed in the shaft member and the outer peripheral surface of the screw shaft by slidably contacting the rolling member rolling groove and the outer peripheral surface of the screw shaft.

5. A plurality of seal members, each seal member being the seal member according to claim 1, wherein the seal members are formed in at least one pair, and the lip portions of the respectively adjacent seal members extend so as to be separated from each other.

6. The seal member according to claim 5, wherein the movable member includes a lubrication unit including a lubricant retaining portion retaining a lubricant and a plurality of lubricant supply portions adapted to apply the lubricant to the rolling member rolling groove formed in the shaft member and the outer peripheral surface of the screw shaft by slidably contacting the rolling member rolling groove and the outer peripheral surface of the screw shaft.

7. The seal member according to claim 1, wherein the movable member includes a lubrication unit including a lubricant retaining portion retaining a lubricant and a plurality of lubricant supply portions adapted to apply the lubricant to a rolling member rolling groove formed in the shaft member and the outer peripheral surface of the shaft member by slidably contacting the rolling member rolling groove and the outer peripheral surface of the screw shaft.

8. A ball screw device comprising;
a screw shaft provided with a helical rolling member rolling groove formed in an outer peripheral surface thereof;
a nut formed with a loaded rolling member rolling groove formed in an inner peripheral surface thereof so as to oppose to the rolling member rolling groove;
a plurality of rolling members arranged between the helical rolling member rolling groove and the loaded rolling member rolling groove to be movable in a rolling manner; and
a seal device mounted to at least one end of the nut,
wherein the seal device is provided with a seal member provided with a body portion mounted to the nut and a lip portion contacting an outer peripheral portion of the screw shaft or the rolling member rolling groove, the lip portion is provided with an oblique surface having an axial section inclining with respect to the axial direction thereof, and a surface opposing the oblique surface of the lip portion so as to intersect the axial direction of the lip portion, the body portion is provided with an urging member urging the lip portion in a radial direction of the screw shaft and a reinforcing portion reinforcing the body portion, and the urging member is located between a reinforcing portion side of the seal member and the side of the seal member away from a tip end of the lip portion in the axial sectional shape of the lip portion,
wherein the tip end of the lip portion is bent always in constant direction on a perpendicular surface side of the lip portion when the seal member is fitted to a linear motion guide apparatus.

9. A linear motion guide apparatus, comprising:
a shaft member;
a movable member;
a plurality of rolling members are interposed so as to perform rolling motion between the shaft member and the movable member; and
at least one seal member mounted to an axial end surface of the movable member, wherein:
the at least one seal member includes a body portion to be mounted to the movable member and a lip portion contacting an outer peripheral portion of the shaft member,
the lip portion is provided with an oblique surface having an inclined profile in an axial section with respect to an axial direction thereof and a surface opposing the oblique surface of the lip portion so as to intersect the axial direction of the lip portion,
the body portion is provided with an urging member urging the lip portion in a radial direction of the shaft member and a reinforcing portion reinforcing the body portion, and
the urging member is located in between a reinforcing portion side of the seal member and the seal member away from a tip end of the lip portion in an axial sectional shape of the lip portion,
wherein the tip end of the lip portion is bent always in constant direction on a perpendicular surface side of the lip portion when the at least one seal member is fitted to the linear motion guide apparatus.

10. The linear motion guide apparatus according to claim 9, wherein a deformed portion is formed on a connecting portion between the oblique surface of the lip portion and the body portion.

11. The linear motion guide apparatus according to claim 9, wherein there are a plurality of said at least one seal member, the seal members are formed in at least one pair, and the lip portions of the respectively adjacent seal members extend so as to be separated from each other.

12. The linear motion guide apparatus according to claim 9, wherein the movable member includes a lubrication unit including a lubricant retaining portion retaining a lubricant and a plurality of lubricant supply portions adapted to apply the lubricant to a rolling member rolling groove formed in the shaft member and the outer peripheral surface of the shaft member by slidably contacting the rolling member rolling groove and the outer peripheral surface of the shaft member.

* * * * *